US010840995B1

(12) United States Patent
Luong et al.

(10) Patent No.: US 10,840,995 B1
(45) Date of Patent: Nov. 17, 2020

(54) DIVERSITY TECHNIQUES IN TRUE WIRELESS STEREO (TWS) SHADOWING

(71) Applicant: QUALCOMM Incorporated, San Diego, CA (US)

(72) Inventors: Le Nguyen Luong, San Diego, CA (US); Thomas Cargill, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/673,291

(22) Filed: Nov. 4, 2019

(51) Int. Cl.
| | | |
|---|---|---|
| *H04L 1/00* | (2006.01) | |
| *H04B 7/08* | (2006.01) | |
| *H04B 7/06* | (2006.01) | |
| *H04R 3/12* | (2006.01) | |
| *H04L 12/26* | (2006.01) | |
| *H04B 17/318* | (2015.01) | |
| *H04W 4/80* | (2018.01) | |

(52) U.S. Cl.
CPC ......... *H04B 7/0888* (2013.01); *H04B 7/0632* (2013.01); *H04B 7/0802* (2013.01); *H04B 17/318* (2015.01); *H04L 43/106* (2013.01); *H04R 3/12* (2013.01); *H04W 4/80* (2018.02)

(58) Field of Classification Search
CPC .. H04B 7/0888; H04B 7/0632; H04B 7/0802; H04B 17/318; H04L 43/106; H04R 3/12; H04W 4/80
USPC .......................................................... 375/346
See application file for complete search history.

(56) References Cited

U.S. PATENT DOCUMENTS

| | | | | |
|---|---|---|---|---|
| 2004/0203541 | A1* | 10/2004 | Coan ..................... | H04B 7/061 455/115.1 |
| 2007/0037538 | A1* | 2/2007 | Shatara ................. | H04B 7/0814 455/277.2 |
| 2012/0328057 | A1* | 12/2012 | Kroeger .............. | H04L 27/2663 375/343 |
| 2019/0150019 | A1* | 5/2019 | Saito .................... | H04B 17/309 370/252 |
| 2020/0106496 | A1* | 4/2020 | Kagitapu ............. | H01Q 1/2291 |

\* cited by examiner

*Primary Examiner* — Don N Vo
(74) *Attorney, Agent, or Firm* — Qualcomm Incorporated

(57) ABSTRACT

This disclosure provides systems, methods and apparatus for improved antenna selection diversity and audio quality. In one aspect, wireless audio devices, such as wireless earbuds, may provide link quality information and timestamps to a source device, which may use such information to select which antenna to use for a subsequent transmission.

29 Claims, 8 Drawing Sheets

140# DIVERSITY TECHNIQUES IN TRUE WIRELESS STEREO (TWS) SHADOWING

TECHNICAL FIELD

This disclosure relates generally to communications between electronic devices, and more particularly to reliable wireless communication between electronic devices.

DESCRIPTION OF THE RELATED TECHNOLOGY

Advances in electronic technology have reduced the cost of increasingly complex and useful wireless communication devices. Cost reduction and consumer demand have proliferated the use of wireless communication devices such that they are practically ubiquitous in modern society. As the use of wireless communication devices has expanded, so has the demand for new and improved features of wireless communication devices. More specifically, wireless communication devices that perform new functions, or that perform functions faster, more efficiently or more reliably are often sought after.

A wireless communication device may make use of one or more wireless communication technologies. For example, a wireless communication device may communicate using Bluetooth technology. A Bluetooth-enabled device may send and receive data to other Bluetooth-enabled devices. For example, a Bluetooth-enabled smartphone may send and receive one or more audio streams to a Bluetooth earbud in a Bluetooth stereo earbud pair topology (i.e., no wire between the ears). As Bluetooth stereo earbuds increase in popularity, it is desirable to improve the reliability of the audio stream to the Bluetooth stereo earbud pair.

SUMMARY

The systems, methods and devices of this disclosure each have several innovative aspects, no single one of which is solely responsible for the desirable attributes disclosed herein.

A method for wireless communication at a source device is described. The method may include: transmitting, at a first antenna of the source device, a first packet to a first wireless audio device; receiving a second packet from the first wireless audio device in response to the transmission of the first packet, the second packet including a link quality indicator and a timestamp associated with a second wireless audio device; and transmitting, at the first antenna or a second antenna of the source device, a third packet to the first wireless audio device based on the link quality indicator in the second packet.

A method for wireless communication at a first wireless audio device is described. The method may include: receiving, at the first wireless audio device, a first packet from a source device; receiving, at the first wireless audio device, a second packet from a second wireless audio device, the second packet including a link quality indicator and a timestamp associated with the second wireless audio device, the link quality indicator being indicative of a signal quality of a signal containing the first packet sniffed by the second wireless audio device; and transmitting, at the first wireless audio device, a third packet to the source device, the third packet including the link quality indicator and the timestamp associated with the second wireless audio device.

A method of wireless communication at first wireless audio device and a second wireless audio device is described. The method may include: sniffing, at the second wireless audio device, a signal containing a first packet transmitted from a source device to the first wireless audio device; transmitting, at the second wireless audio device, a second packet to the first wireless audio device, the second packet including a link quality indicator and a timestamp associated with the sniffing of the signal at the second wireless audio device; and transmitting, at the first wireless audio device, a third packet to the source device in response to receiving the second packet from the second wireless audio device, the third packet including the link quality indicator and the timestamp associated with the sniffing of the signal at the second wireless audio device.

An apparatus for wireless communication at a source device is described. The apparatus may include a processor, memory in electronic communication with the processor, and instructions stored in the memory and executable by the processor to cause the apparatus to: transmit, at a first antenna of the source device, a first packet to a first wireless audio device; receive a second packet from the first wireless audio device in response to the transmission of the first packet, the second packet including a link quality indicator and a timestamp associated with a second wireless audio device; and transmit, at the first antenna or a second antenna of the source device, a third packet to the first wireless audio device based on the link quality indicator in the second packet.

An apparatus for wireless communication at a first wireless audio device is described. The apparatus may include a processor, memory in electronic communication with the processor, and instructions stored in the memory and executable by the processor to cause the apparatus to: receive a first packet from a source device; receive a second packet from a second wireless audio device, the second packet including a link quality indicator and a timestamp associated with the second wireless audio device, the link quality indicator being indicative of a signal quality of a signal containing the first packet sniffed by the second wireless audio device; and transmit a third packet to the source device, the third packet including the link quality indicator and the timestamp associated with the second wireless audio device.

A system for wireless communication is described. The system may include a first wireless audio device, and a second wireless audio device in wireless communication with the first wireless audio device, the second wireless audio device configured to: sniff a signal containing a first packet transmitted from a source device to the first wireless audio device, and transmit a second packet to the first wireless audio device, the second packet including a link quality indicator and a timestamp associated with the sniffing of the signal at the second wireless audio device, wherein the first wireless audio device is configured to transmit a third packet to the source device in response to receiving the second packet from the second wireless audio device, the third packet including the link quality indicator and the timestamp associated with the sniffing of the signal at the second wireless audio device.

An apparatus for wireless communication at a source device is described. The apparatus may include means for transmitting, at a first antenna of the source device, a first packet to a first wireless audio device, means for receiving a second packet from the first wireless audio device in response to the transmission of the first packet, the second packet including a link quality indicator and a timestamp associated with a second wireless audio device, and means for transmitting, at the first antenna or a second antenna of the source device, a third packet to the first wireless audio device based on the link quality indicator in the second packet.

An apparatus for wireless communication at a first wireless audio device is described. The apparatus may include means for receiving a first packet from a source device, means for receiving a second packet from a second wireless audio device, the second packet including a link quality indicator and a timestamp associated with the second wireless audio device, the link quality indicator being indicative of a signal quality of a signal containing the first packet sniffed by the second wireless audio device, and means for transmitting a third packet to the source device, the third packet including the link quality indicator and the timestamp associated with the second wireless audio device.

A system for wireless communication at first wireless audio device and a second wireless audio device is described. The system may include means for sniffing, at the second wireless audio device, a signal containing a first packet transmitted from a source device to the first wireless audio device, means for transmitting, at the second wireless audio device, a second packet to the first wireless audio device, the second packet including a link quality indicator and a timestamp associated with the sniffing of the signal at the second wireless audio device, and means for transmitting, at the first wireless audio device, a third packet to the source device in response to receiving the second packet from the second wireless audio device, the third packet including the link quality indicator and the timestamp associated with the sniffing of the signal at the second wireless audio device.

Details of one or more implementations of the subject matter described in this disclosure are set forth in the accompanying drawings and the description below. Other features, aspects, and advantages will become apparent from the description, the drawings and the claims. Note that the relative dimensions of the following figures may not be drawn to scale.

BRIEF DESCRIPTION OF THE DRAWINGS

Like reference numbers and designations in the various drawings indicate like elements.

DETAILED DESCRIPTION

Figure 1:
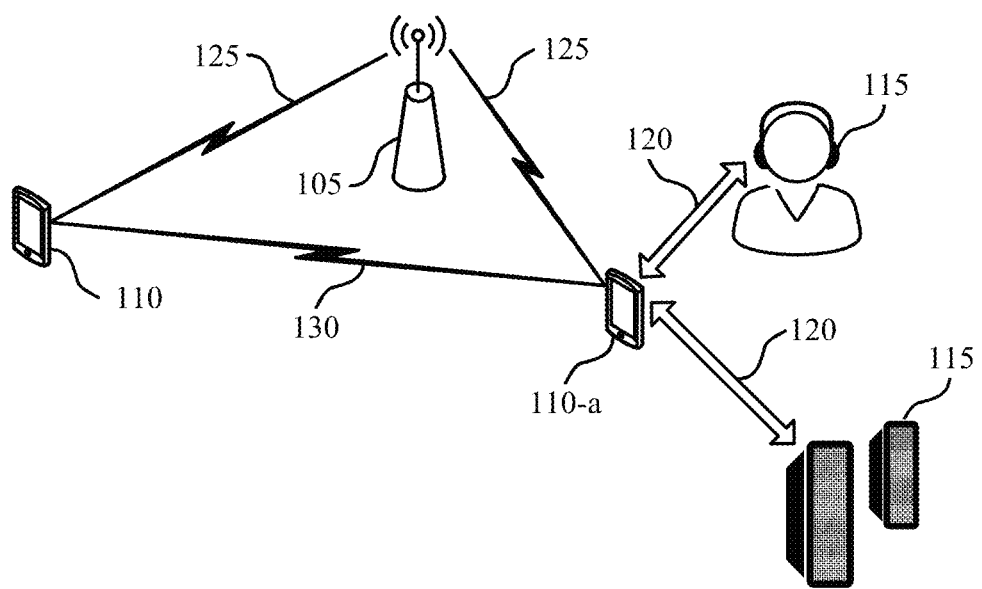
FIG. 1 illustrates an example of a system for wireless communications that supports improved antenna selection diversity in accordance with aspects of the present disclosure.

Some wireless communications systems may be capable of supporting communication, and more specifically, Bluetooth-enabled communication between devices (e.g., a smartphone and a Bluetooth-enabled device). For Bluetooth-enabled devices, there may be a set of components where one component may be the primary component and the other component may be a secondary component. For example, in a pair of wireless Bluetooth-enabled earbuds, one earbud may be a primary earbud (e.g., a master device) and the other a secondary earbud (e.g., a slave device). The secondary earbud may shadow, sniff, or eavesdrop on the connection between the primary earbud and the source device (e.g., a smartphone or other audio source).

Transmit diversity techniques, such as antenna selection diversity and beamforming, are used to improve the link quality between the source device and the primary earbud. However, in some cases, such transmit diversity techniques could decrease the audio quality at the secondary earbud by suppressing the signal that is sniffed by the secondary earbud to a level that may no longer be detectable. To maintain or improve a quality of communications (e.g., voice and audio data transmissions) between the earbuds and the source device, the secondary earbud may communicate its signal quality (e.g., its receive signal strength indicator (RSSI)) with a timestamp to the primary earbud. The primary earbud can then relay that information to the source device. Based on the signal quality and timestamp information from the secondary earbud, along with link quality information from the primary earbud, the source device will select an antenna that works best for both the primary and secondary earbuds. Although this disclosure describes various examples—including but not limited to Bluetooth earbuds—other examples are contemplated and are applicable here. This disclosure is not limited to Bluetooth earbuds, Bluetooth devices, etc. but instead the concepts are applicable to various devices in various wireless communications scenarios.

The following description is directed to certain implementations for the purposes of describing the innovative aspects of this disclosure. However, a person having ordinary skill in the art will readily recognize that the teachings herein can be applied in a multitude of different ways. Some of the examples in this disclosure are based on wireless and wired local area network (LAN) communication according to the Institute of Electrical and Electronics Engineers (IEEE) 802.11 wireless standards, the IEEE 802.3 Ethernet standards, and the IEEE 1901 Powerline communication (PLC) standards. However, the described implementations may be implemented in any device, system or network that is capable of transmitting and receiving RF signals according to any of the wireless communication standards, including any of the IEEE 802.11 standards, the IEEE 802.15.1 Bluetooth® standards, Bluetooth low energy (BLE), code division multiple access (CDMA), frequency division multiple access (FDMA), time division multiple access (TDMA), Global System for Mobile communications (GSM), GSM/General Packet Radio Service (GPRS), Enhanced Data GSM Environment (EDGE), Terrestrial Trunked Radio (TETRA), Wideband-CDMA (W-CDMA), Evolution Data Optimized (EV-DO), 1×EV-DO, EV-DO Rev A, EV-DO Rev B, High Speed Packet Access (HSPA), High Speed Downlink Packet Access (HSDPA), High Speed Uplink Packet Access (HSUPA), Evolved High Speed Packet Access (HSPA+), Long Term Evolution (LTE), AMPS, or other known signals that are used to communicate within a wireless, cellular or internet of things (IOT) network, such as a system utilizing 3G, 4G or 5G, or further implementations thereof, technology.

Various implementations are described herein using Bluetooth and Bluetooth-related terminology as a convenient example of a communications technology for wirelessly connecting electronic devices located within a relatively short distance of one another, such as less than about 100 meters. While this disclosure uses examples referring to Bluetooth, a person having ordinary skill in the art will readily recognize that examples referring to Bluetooth technology are for illustration purposes only and are not intended to limit the descriptions or the claims to that particular standard. For example, WiFi, or other similar short range wireless communication technologies can be used herein.

As described herein, the source device can be implemented in a wide variety of designs, having varying degrees of form factors and functionalities, all of which including the ability to transmit and receive data, including audio data, wirelessly. The master and slave devices, also known as wireless nodes or sink devices, also can be implemented in a wide variety of designs, and including the ability to transmit and receive data wirelessly. In one example implementation, the source device is a smartphone, and the sink devices are a pair of Bluetooth-enabled wireless earbuds. In some implementations, the earbuds can be implemented as Bluetooth-enabled true wireless stereo (TWS) earbuds, where the earbuds can communicate wirelessly with one another, and with the source device.

FIG. 1 illustrates an example of a wireless communication system 100 (e.g., which may refer to or include a wireless personal area network (PAN), a wireless local area network (WLAN), a Wi-Fi network, or any other wireless network) configured in accordance with various aspects of the present disclosure. The wireless communication system 100 may include an AP 105, devices (e.g., source devices 110), and paired devices (e.g., wireless audio devices 115) implementing WLAN communications (e.g., Wi-Fi communications) and/or Bluetooth communications. For example, source devices 110 may include cell phones, mobile stations, personal digital assistant (PDAs), other handheld devices, netbooks, notebook computers, tablet computers, laptops, or some other suitable terminology. Paired devices (e.g., wireless audio devices 115) may include Bluetooth devices capable of pairing with other Bluetooth devices (e.g., such as source devices 110). For example, paired devices may include wireless headsets, wireless audio devices, wireless speakers, wireless earbuds, ear pieces, headphones, display devices (e.g., TVs, computer monitors), microphones, meters, valves, Internet of Things (IoT) devices, etc.

Bluetooth communications may refer to a short-range communication protocol and may be used to connect and exchange information between source devices 110 and wireless audio devices 115 (e.g., between mobile phones, computers, laptops, tablets, digital cameras, wireless headsets, wireless audio devices, wireless speakers, wireless earbuds, ear pieces, headphones, display devices, keyboards, mice, IoT devices or other input peripherals and similar devices). Bluetooth systems (e.g., aspects of wireless communication system 100) may be organized using a master-slave relationship employing a time division duplex protocol having, for example, defined time slots of 625 mu secs, in which transmission alternates between the master device (e.g., a source device 110) and one or more slave devices (e.g., paired devices such as wireless audio devices 115). In some cases, a source device 110 may generally refer to a master device, and a wireless audio device 115 may refer to a slave device in a PAN. As such, in some cases, a device may be referred to as either a source device 110 or a wireless audio device 115 based on the Bluetooth role configuration of the device. That is, designation of a device as either a source device 110 or a wireless audio device 115 may not necessarily indicate a distinction in device capability, but rather may refer to or indicate roles held by the device in the PAN. Generally, source device 110 may refer to a wireless communication device capable of wirelessly exchanging data signals with another device, and wireless audio device 115 may refer to a device operating in a slave role, or to a short-range wireless device capable of exchanging data signals with the mobile device (e.g., using Bluetooth communication protocols).

A Bluetooth device may be compatible with certain Bluetooth profiles to use desired services. A Bluetooth profile may refer to a specification regarding an aspect of Bluetooth-based wireless communications between devices. That is, a profile specification may refer to a set of instructions for using the Bluetooth protocol stack in a certain way, and may include information such as suggested user interface formats, particular options and parameters at each layer of the Bluetooth protocol stack, etc. For example, a Bluetooth specification may include various profiles that define the behavior associated with each communication endpoint to implement a specific use case. Profiles may thus generally be defined according to a protocol stack that promotes and allows interoperability between endpoint devices from different manufacturers through enabling applications to discover and use services that other nearby Bluetooth devices may be offering. The Bluetooth specification defines device role pairs that together form a single use case called a profile. One example profile defined in the Bluetooth specification is the Handsfree Profile (HFP) for voice telephony, in which one device implements an Audio Gateway (AG) role and the other device implements a Handsfree (HF) device role. Another example is the Advanced Audio Distribution Profile (A2DP) for high-quality audio streaming, in which one device (e.g., source device 110-$a$) implements an audio source device (SRC) role and another device (e.g., wireless audio device 115) implements an audio sink device (SNK) role.

For a commercial Bluetooth device that implements one role in a profile to function properly, another device that implements the corresponding role must be present within the radio range of the first device. For example, in order for an HF device such as a Bluetooth headset to function according to the Handsfree Profile, a device implementing the AG role (e.g., a cell phone) must be present within radio range. Likewise, in order to stream high-quality mono or stereo audio according to the A2DP, a device implementing the SNK role (e.g., Bluetooth headphones or Bluetooth wireless audio devices) must be within radio range of a device implementing the SRC role (e.g., a stereo music player).

A communication link 120 established between two Bluetooth devices (e.g., between a source device 110-$a$ and a wireless audio device 115) may provide for communications or services (e.g., according to some Bluetooth profile). For example, a Bluetooth connection may be an extended synchronous connection orientated (eSCO) link for voice call (e.g., which may allow for retransmission), an ACL link for music streaming (e.g., A2DP), etc. For example, eSCO packets may be transmitted in predetermined time slots (e.g., 6 Bluetooth slots each for eSCO). The regular interval between the eSCO packets may be specified when the Bluetooth link is established. The eSCO packets to/from a specific slave device (e.g., wireless audio device 115) are acknowledged, and may be retransmitted if not acknowledged during a retransmission window. In addition, audio may be streamed between the source device 110-$a$ and wireless audio device 115 using an ACL link (A2DP profile). In some cases, the ACL link may occupy 1, 3, or 5 Bluetooth slots for data or voice. Other Bluetooth profiles supported by Bluetooth devices may include Bluetooth Low Energy (BLE) (e.g., providing considerably reduced power consumption and cost while maintaining a similar communication range), human interface device profile (HID) (e.g., providing low latency links with low power requirements), etc.

In some cases, a device may be capable of both Bluetooth and WLAN communications. For example, WLAN and Bluetooth components may be co-located within a device, such that the device may be capable of communicating according to both Bluetooth and WLAN communication protocols, as each technology may offer different benefits or may improve user experience in different conditions. In some cases, Bluetooth and WLAN communications may share a same medium, such as the same unlicensed frequency medium. In such cases, a source device 110 may support WLAN communications via AP 105, which may include communicating over communication links 125 (e.g., WLAN communication links). The AP 105 and the associated source devices 110 may represent a basic service set (BSS) or an extended service set (ESS). The various source devices 110 in the network may be able to communicate with one another through the AP 105. In some cases, the AP 105 may be associated with a coverage area, which may represent a basic service area (BSA).

Source devices 110 and APs 105 may communicate according to the WLAN radio and baseband protocol for physical and MAC layers from IEEE 802.11 and versions including, but not limited to, 802.11b, 802.11g, 802.11a, 802.11n, 802.11ac, 802.11ad, 802.11ah, 802.11ax, etc. In other implementations, peer-to-peer connections or ad hoc networks may be implemented within wireless communication system 100, and devices may communicate with each other via communication links 130 (e.g., peer-to-peer communication links). AP 105 may be coupled to a network, such as the Internet, and may enable a source device 110 to communicate via the network (or communicate with other source devices 110 coupled to the AP 105). A source device 110 may communicate with a network device bi-directionally. For example, in a WLAN, a source device 110 may communicate with an associated AP 105 via downlink (e.g., the communication link from the AP 105 to the source device 110) and uplink (e.g., the communication link from the source device 110 to the AP 105). The source device 110 may also be capable of cellular communications with the AP 105 or other network device, and may communicate with the network device bi-directionally via cellular communication standards.

In some examples, content, media, audio, etc. exchanged between a source device 110 and a wireless audio device 115 may originate from a WLAN. For example, in some cases, source device 110-a may receive audio from an AP 105 (e.g., via WLAN communications), and the source device 110-a may then implement the described techniques to relay or pass the audio to the wireless audio device 115 (e.g., via Bluetooth communications). In some cases, certain types of Bluetooth communications (e.g., such as high quality or high definition (HD) Bluetooth) may require enhanced quality of service. For example, in some cases, delay-sensitive Bluetooth traffic may have higher priority than WLAN traffic.

Figure 2:
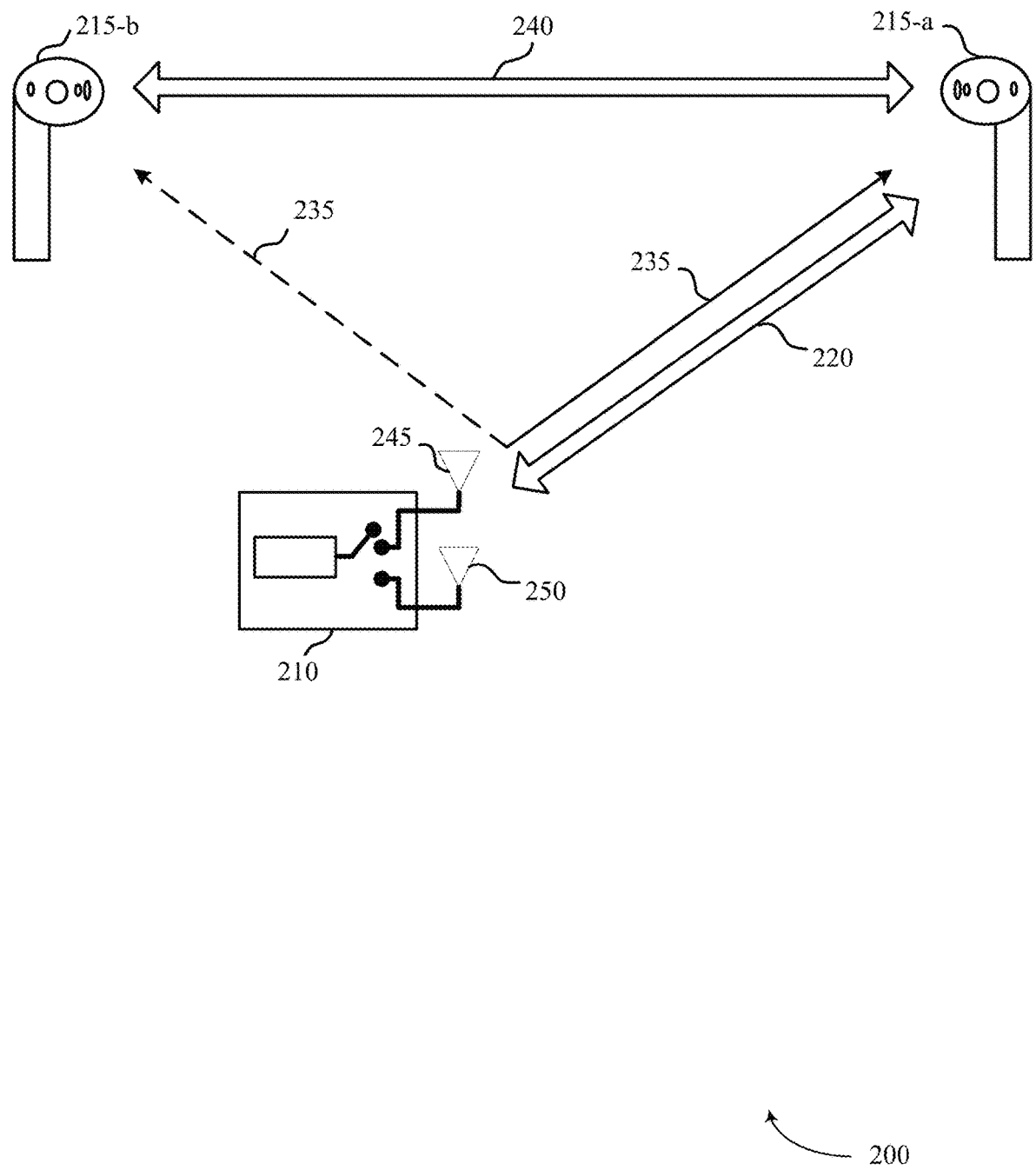
FIG. 2 illustrates an example topology that supports improved antenna selection diversity in accordance with aspects of the present disclosure.

FIG. 2 illustrates an example topology 200 of a source device communicating with one or more sink devices, in accordance with aspects of the present disclosure. In some examples, the topology 200 may implement aspects of wireless communication system 100. In some examples, the topology 200 may include a source device 210, a first wireless audio device 215-a, and a second wireless audio device 215-b. The source device 210 is capable of wireless communication and can be implemented to communicate wirelessly with one or more sink devices, such as wireless earbuds or first and second wireless audio devices 215-a and 215-b. In The topology 200 may be a first generation true wireless stereo (TWS) earbuds example, as depicted. In some examples, the source device 210 may communicate with first wireless audio device 215-a via a bidirectional primary communication link 220. The source device 210 may transmit audio data 235 to the first wireless audio device 215-a. The audio data 235 may include but no be limited to, for example, an audio stream, stereo audio data, audio received from a phone call, the voice of a virtual assistant such as Alexa®, Siri® or Cortana®, etc. In some examples, the first wireless audio device 215-a may establish a communication link 240 with the second wireless audio device 215-b. In some examples, the source device 210 may perform the role of a master device and the first wireless audio device 215-a may perform the role of a slave device to the source device 210.

The first wireless audio device 215-a and the second wireless audio device 215-b may communicate with each other via bidirectional communication link 240. Although the bidirectional communication link 240 is depicted as a single connection link, in some examples, separate wireless links for each direction (i.e., from the first wireless audio device 215-a to the second wireless audio device 215-b and from the second wireless audio device 215-b to the first wireless audio device 215-a) may be used. The first wireless audio device 215-a can send, forward, or otherwise relay, information received from the source device 210 to the second wireless audio device 215-b. The first wireless audio device 215-a can also send, forward, or otherwise relay information received from the second wireless audio device 215-b to the source device 210. In some examples, the first wireless audio device 215-a may perform connection or synchronization procedures with the second wireless audio device 215-b via the communication link 240. The first wireless audio device 215-a may perform the role of a master device, and the second wireless audio device 215-b may perform the role of a slave device to the first wireless audio device 215-a.

In some examples, the second wireless audio device 215-b may perform Bluetooth sniffing procedures and may receive data, e.g., audio data 235, that is sent from the source device 210 to the first wireless audio device 215-a. For instance, while the source device 210 is transmitting a data or audio stream to the first wireless audio device 215-a over the communication link 220, the second wireless audio device 215-b can be implemented to passively listen to the transmitted data or audio stream. In an example, the source device 210 can transmit an audio stream including audio data for both the first and second wireless audio devices 215-a and 215-b over the communication link 220 to the first wireless audio device 215-a, while the second wireless audio device 215-b is passively listening, monitoring, eavesdropping, or otherwise "sniffing" the audio data being transmitted over the communication link 220 to the first wireless audio device 215-a. In such an example, the second wireless audio device 215-b can obtain the audio data intended for the first wireless audio device 215-a even though the source device 210 only transmitted the audio stream to the first wireless audio device 215-a.

In examples where one wireless audio device is unable to sniff the data or audio stream transmitted to the other wireless audio device, the wireless audio device receiving the data or audio stream can be configured to forward the data or audio stream to the other wireless audio device. For example, when the source device 210 transmits audio data for both the first and second wireless audio devices 215-*a* and 215-*b* over the wireless connection link 220 to the first wireless audio device 215-*a*, and the second wireless audio device 215-*b* is unable to passively listen, monitor, eavesdrop, or otherwise sniff the transmitted audio data, the first wireless audio device 215-*a* can be configured to automatically forward, or otherwise relay, the audio data intended for the second wireless audio device 215-*b* to the second wireless audio device 215-*b*. Alternatively, the first wireless audio device 215-*a* can be configured to forward, or otherwise relay, the audio data intended for the second wireless audio device 215-*b* upon receiving a forwarding request from the second wireless audio device 215-*b*. In a second generation TWS earbuds example (not depicted), the source device 210 can establish separate wireless communication links with the first and second wireless audio devices 215-*a* and 215-*b*, and can send and receive data and audio streams to each of the first and second wireless audio devices 215-*a* and 215-*b* over the separate wireless communication links, respectively.

As described herein, a source device, also may be referred to as a smartphone, a mobile device, wireless device, a wireless node, a receiver device, a remote device, a handheld device, or a subscriber device, or some other suitable terminology, where the "device" also may be referred to as a unit, a station, a terminal, or a client. The source device may be implemented as any computing device configured to receive, process and otherwise handle information, including audio or visual or audio/visual (i.e., video), over a communications network. The source device also may be a cellular phone, a personal digital assistant (PDA), a laptop or laptop computer, a tablet device, a personal computer, a gaming console, a virtual or augmented reality device, a drone, an Internet of Things (IoT) device, or other electronic system. IoT devices also may be referred to as an Internet of Everything (IoE) device, an IoT hub, and IoE hub, or any other physical device, vehicle, or home appliance that is embedded with electronics and network connectivity, which enable these objects to connect and exchange data. The IoT device also may be referred to as a virtual assistant device, such as Amazon Alexa®, Google Home®, etc., a wearable device, such as smart watches, Google Glass®, etc., an in-vehicle entertainment or communication system, a home security system, or any device having an interface, such as a network interface, to a communications network and suitable input and output devices. Wearable devices also may be referred to as wearable technology, wearable gadgets, wearables, or some other suitable terminology, which generally describes electronics and software-based technology that is worn on the body, either as an accessory, or as part of material used in clothing.

As described herein, a sink device also may be referred to as a wireless node, a destination device, or a wireless audio device. A sink device can be implemented to receive data over a communications medium from one or more source devices. Source devices, as described above, also can be implemented as sink devices. In addition, wearable devices, including earbuds, such as Apple AirPods®, Bose SoundSport®, Philips True Wireless®, Samsung Gear®, as well as wireless head phone sets, ear pieces, wireless speakers, display devices, keyboards, mice, IoT devices or other input peripherals and similar devices can be implemented as sink devices.

The communication links 220 and 240 also may be referred to as wireless connection links or wireless data transfers, and can occur over any suitable communication network that enables devices to communicate with one another over a communication medium. Examples of protocols that can be used to form communication networks can include, Bluetooth, Bluetooth Low Energy (BLE), near-field communication (NFC) technology, radio-frequency identification (RFID) technology, Zigbee, or Wi-Fi (i.e., Institute of Electrical and Electronics Engineers (IEEE) 802.11) technology. Additional protocols include the Internet Protocol ("IP"), Transmission Control Protocol ("TCP"), User Datagram Protocol ("UDP"), device-to-device (D2D) protocols, long-term evolution direct (LTE-D), narrow band Internet of Things (NB-IoT), LTE category M (LTE CAT-M), Vehicle-to-X (V2X), or other such types of protocols described throughout this disclosure.

The source device 210 can be implemented to communicate directly or indirectly with the first and second wireless audio devices 215-*a* and 215-*b*, respectively, using communication protocols provided by one or more of these example communication networks. For example, the source device 210 can communicate with the first and second wireless audio devices 215-*a* and 215-*b* over Bluetooth. Additionally, the first and second wireless audio devices 215-*a* and 215-*b* can be implemented to communicate with each other using communication protocols provided by one or more of these example communication networks. For example, the first wireless audio device 215-*a* can communicate with the second wireless audio device 215-*b* using Bluetooth master and slave topology.

In some aspects, the source device 210 may have more than one antenna to perform improved antenna selection diversity techniques. For instance, the source device 210 may have a first antenna 245 and a second antenna 250. Although shown and described as having only two antennas, it is to be understood that the source device 210 may have more than two antennas, and that the aspects described herein can apply to any source device with two or more antennas. In some aspects, the source device 210 selects which of the first antenna 245 or the second antenna 250 to use for transmission based on link quality information from the first and second wireless audio devices 215-*a* and 215-*b*.

For example, when the source device 210 transmits a signal to the first wireless device 215-*a*, the second wireless audio device 215-*b* can sniff the signal and also perform a link quality measurement, such as measure a received signal strength indicator (RSSI), signal-to-noise ratio (SNR), packet error rate (PER), or other type of signal power parameter. The second wireless audio device 215-*b* may then communicate to the first wireless audio device 215-*a*, a link quality indicator indicative of the link quality measurement performed during sniffing, as well as a timestamp identifying a time the link quality measurement was performed at the second wireless audio device 215-*b*. The first wireless audio device 215-*a* can relay to the source device 210, the link quality indicator and the timestamp from the second wireless audio device 215-*b*. Along with the link quality indicator and the time stamp from the second wireless audio device 215-*b*, the first wireless audio device 215-*a* may also transmit its own link quality indicator indicative of a link quality measurement performed during reception of the signal from the source device 210 to the first wireless device 215-*a*, as well as a timestamp identifying a time the link quality measurement was performed at the first wireless audio device 215-*a*.

In some aspects, the source device 210 identifies which of the first antenna 245 or the second antenna 250 was used to transmit the signal associated with the link quality indicators based on the timestamps from the first and second wireless audio devices 215-a and 215-b. For example, the source device 210 may store in a memory of the source device 210 a record of which of the first antenna 245 or the second antenna 250 was used at which time. When the source device 210 receives the link quality indicators and timestamps from the first wireless audio device 215-a, the source device 210 retrieves from the memory which of the first antenna 245 or the second antenna 250 was used at the time identified by the timestamps. It is also to be understood that the first wireless audio device 215-a may transmit only one timestamp associated with one of the link quality indicators from the first wireless audio device 215-a or the second wireless audio device 215-b, and the source device 210 may identify which of the first antenna 245 or the second antenna 250 was used to transmit the signal associated with the link quality indicators based on the single timestamp.

In some aspects, the source device 210 compares the link quality indicators to at least one predetermined threshold. The at least one predetermined threshold may comprise an acceptable level of signal quality (e.g., acceptable RSSI, SNR, PER, etc.) at the first wireless audio device 215-a and the second wireless audio device 215-b. For example, the source device 210 may compare the link quality indicator associated with the first wireless audio device 215-a to a first predetermined threshold for the first wireless audio device 215-a, and the source device 210 may compare the link quality indicator associated with the second wireless audio device 215-b to a second predetermined threshold for the second wireless audio device 215-b. In some aspects, the first predetermined threshold may be the same as to the second predetermined threshold. In some aspects, the first predetermined threshold may be different from the second predetermined threshold.

Based on the comparison of the link quality indicators to the predetermined thresholds, the source device 210 may determine which of the first antenna 245 or the second antenna 250 to use for a subsequent transmission. If both link quality indicators are equal to or greater than their respective predetermined thresholds for the first and second wireless audio devices 215-a and 215-b, then the source device 210 may select a same antenna that was used to transmit the signal associated with the link quality indicators. If one or both of the link quality indicators is less than their respective predetermined thresholds for the first and second wireless audio devices 215-a and 215-b, then the source device 210 may select a different antenna that was used to transmit the signal associated with the link quality indicators. For instance, if the first antenna 245 was previously used for transmission, then the source device 210 will select the second antenna 250 for the subsequent transmission, or vice versa.

Furthermore, the source device 210 may continue to receive from the first wireless audio device 215-a, link quality indicators associated with the first and second wireless audio devices 215-a and 215-b for subsequent transmissions. As such, the source device 210 can dynamically select which of the first antenna 245 or the second antenna 250 to use for transmission based on real-time or immediate feedback. In so doing, improved antenna selection diversity and audio quality may be provided to the first and second wireless audio devices 215-a and 215-b.

Figure 3:
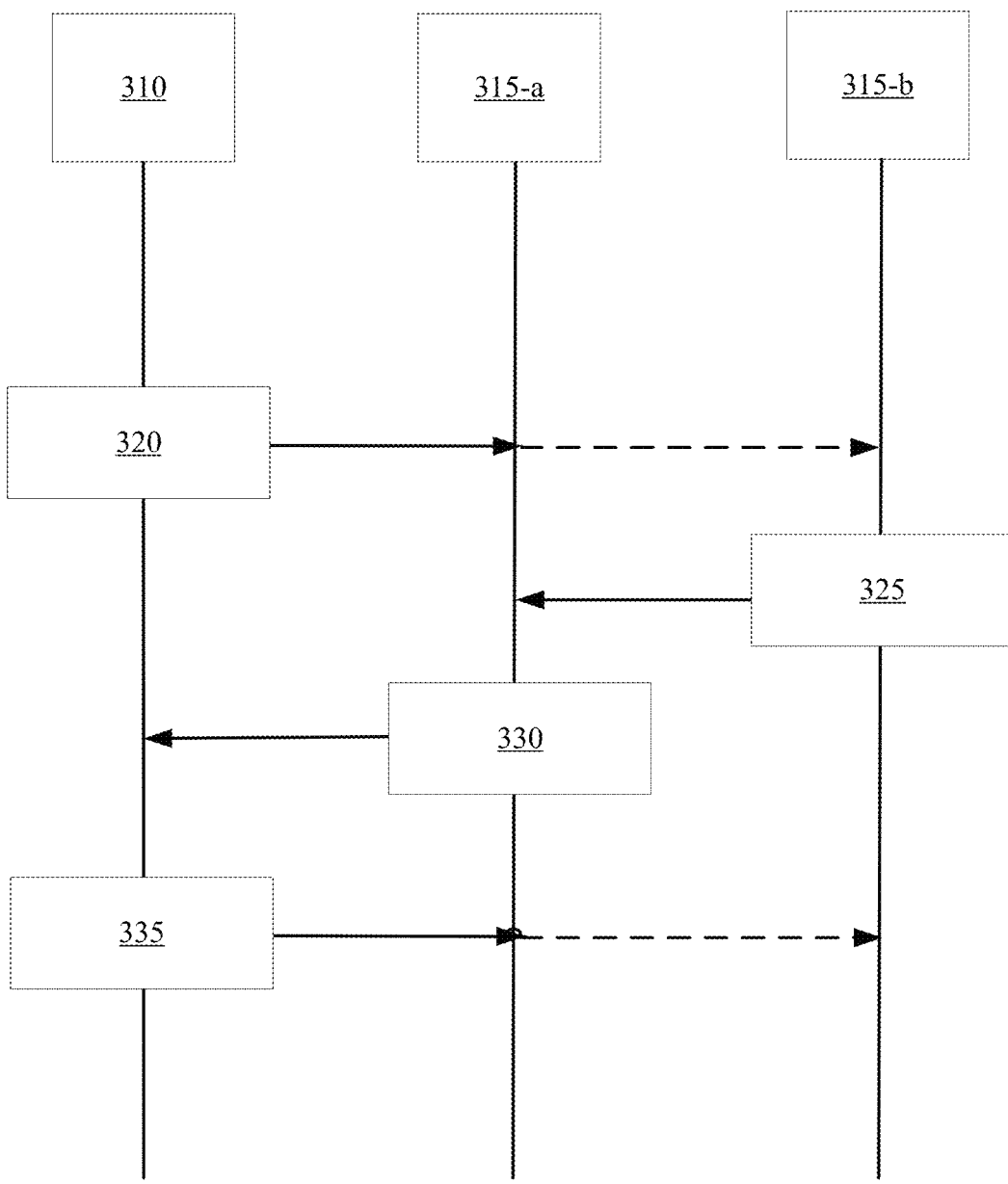
FIG. 3 illustrates an example process flow that supports improved antenna selection diversity in accordance with aspects of the present disclosure.

FIG. 3 illustrates an example of a process flow 300 that supports improved antenna selection diversity in accordance with various aspects of the present disclosure. In some examples, process flow 300 may implement aspects of wireless communication system 100 and topology 200. Process flow 300 may include a source device 310, a first wireless audio device 315-a, and a second wireless audio device 315-b. The process flow 300 may include more than three wireless devices and communications between more than three wireless devices. For example, there may be more than one source device and/or more than two wireless audio devices.

The source device 310 may generate and transmit, at a first antenna of the source device 310, a first packet 320 (e.g., including audio data) to the first wireless audio device 315-a, and the second wireless audio device 315-b may sniff the first packet 320, or a signal containing the first packet 320 that is transmitted from the source device 310 to the first wireless audio device 315-a. The second wireless audio device 315-b may measure a link quality, or a signal quality, of the signal containing the first packet 320 that is being sniffed. For example, the second wireless audio device 315-b may measure a received signal strength indicator (RSSI), a signal-to-noise ratio (SNR), a packet error rate (PER), other type of signal or link quality measurement, or a combination thereof. The second wireless audio device 315-b may also record a timestamp that identifies a time the link quality was measured.

The second wireless audio device 315-b may generate and transmit a second packet 325 to the first wireless audio device 315-a, such as in response to the transmission and sniffing of the signal containing the first packet 320. The second packet 325 may include a link quality indicator indicative of the link quality, or signal quality, of the signal containing the first packet 320 sniffed by the second wireless audio device 315-b. For example, the link quality indicator may comprise the RSSI, the SNR, the PER, the other type of signal or link quality measurement, or combination thereof, measured at the second wireless audio device 315-b during sniffing of the signal containing the first packet 320 transmitted from the source device 310 to the first wireless audio device 315-a. The second packet 325 may also include the timestamp identifying the time that the link quality, represented by the link quality indicator, was measured at the second wireless audio device 315-b.

The first wireless audio device 315-a may generate and transmit a third packet 330 to the source device 310. The third packet 330 may include the link quality indicator and the timestamp which was included in the second packet 325, the link quality indicator and the timestamp being associated with the sniffing by the second wireless audio device 315-b of the signal containing the first packet 320. In other words, the first wireless audio device 315-a may relay the link quality indicator and the timestamp at the second wireless audio device 315-b to the source device 310.

Along with the link quality indicator and the timestamp information associated with the second wireless audio device 315-b, the first wireless audio device 315-a may provide in the third packet 330, a link quality indicator and a timestamp associated with a measured link quality at the first wireless audio device 315-a during transmission of the first packet 320 by the first antenna of the source device 310. In other words, the third packet 330 may further include a link quality indicator and a timestamp associated with the reception of the first packet 320 at the first wireless device 315-a. Therefore, the third packet 330 may include link quality indicators and timestamps for both the first and second wireless audio devices 315-a and 315-b. In so doing, the third packet 330 may provide an audio quality of the reception of the first packet 320 at the first and second wireless audio devices 315-a and 315-b.

Upon receiving the third packet 330, the source device 310 obtains the link quality indicator and the timestamp associated with the sniffing by the second wireless audio device 315-*b* of the signal containing the first packet 320. Based on the timestamp, the source device 310 can determine which antenna was used to transmit the first packet 320 from the source device 310. Specifically, the source device 310 can determine the link quality indicator is indicative of the link quality, or the signal quality, of the signal containing the first packet 320 from the first antenna of the source device 310 based on the timestamp. For example, the source device 310 can retrieve from a memory of the source device 310 which antenna was used at the time identified in the timestamp.

In addition, the source device 310 can compare the link quality indicator associated with the sniffing by the second wireless audio device 315-*b* to a predetermined threshold for the second wireless audio device 315-*b*. The predetermined threshold may comprise an acceptable link quality or signal quality, such as an acceptable level for RSSI, SNR, PER, or other link quality measurement. Based on the comparison of the link quality indicator to the predetermined threshold, the source device 310 can perform improved antenna selection diversity. If the link quality indicator is greater than or equal to the predetermined threshold, the source device 310 may select the same antenna for subsequent transmission of a fourth packet 335 as the antenna that was used for transmission of the first packet 320, i.e., the first antenna. If the link quality indicator is less than the predetermined threshold, the source device 310 may select a different antenna from the first antenna for subsequent transmission of the fourth packet 335. After selecting which antenna to use, the source device 310 transmits the fourth packet 335 from the selected antenna. Continual antenna selection may be based on further relay of the link quality indicator associated with the second wireless audio device 315-*b* to the source device 310.

Furthermore, the source device 310 can compare the link quality indicator associated with the first wireless audio device 315-*a* to a predetermined threshold for the first wireless audio device 315-*a*. In some aspects, the predetermined threshold for the first wireless audio device 315-*a* may be equal to the predetermined threshold for the second wireless audio device 315-*b*. In some aspects, the predetermined threshold for the first wireless audio device 315-*a* may be different than the predetermined threshold for the second wireless audio device 315-*b*.

If the link quality indicator associated with the first wireless audio device 315-*a* is greater than the predetermined threshold for the first wireless audio device 315-*a*, and if the link quality indicator associated with the second wireless audio device 315-*b* is greater than or equal to the predetermined threshold for the second wireless audio device 315-*b*, the source device 310 may select the same antenna for subsequent transmission of the fourth packet 335 as the antenna that was used for transmission of the first packet 320, i.e., the first antenna. If the link quality indicators associated with both the first and second wireless audio devices 315-*a* and 315-*b* are greater than or equal to their respective predetermined thresholds, this may indicate that the audio quality of the first antenna of the source device 310 is acceptable. Thus, the source device 310 may select the first antenna again for subsequent transmission of the fourth packet 335.

If at least one of: the link quality indicator associated with the first wireless audio device 315-*a* is less than the predetermined threshold for the first wireless audio device 315-*a*, or the link quality indicator associated with the second wireless audio device 315-*b* is less than the predetermined threshold for the second wireless audio device 315-*b*, the source device 310 may select a different antenna from the first antenna for subsequent transmission of the fourth packet 335. If one or both of the link quality indicators associated with the first and second wireless audio devices 315-*a* and 315-*b* is less than their respective predetermined thresholds, this may indicate that the audio quality of the first antenna of the source device 310 is unacceptable. Thus, the source device 310 may select a second antenna for subsequent transmission of the fourth packet 335, which can result in improved antenna selection diversity.

After selecting which antenna to use based on the link quality indicators associated with the first and second wireless audio devices 315-*a* and 315-*b*, the source device 310 transmits the fourth packet 335 from the selected antenna. Continual antenna selection at the source device 310 may be based on further reception of the link quality indicators associated with the first and second wireless audio devices 315-*a* and 315-*b*. In so doing, the source device 310 may select an antenna that has reliable audio quality for both the first and second wireless audio devices 315-*a* and 315-*b*. In an example, based on the link quality indicators associated with the first and second wireless audio devices 315-*a* and 315-*b*, the source device 310 may alternate between the first and second antennas in order to maintain reliable audio quality.

Figure 4:
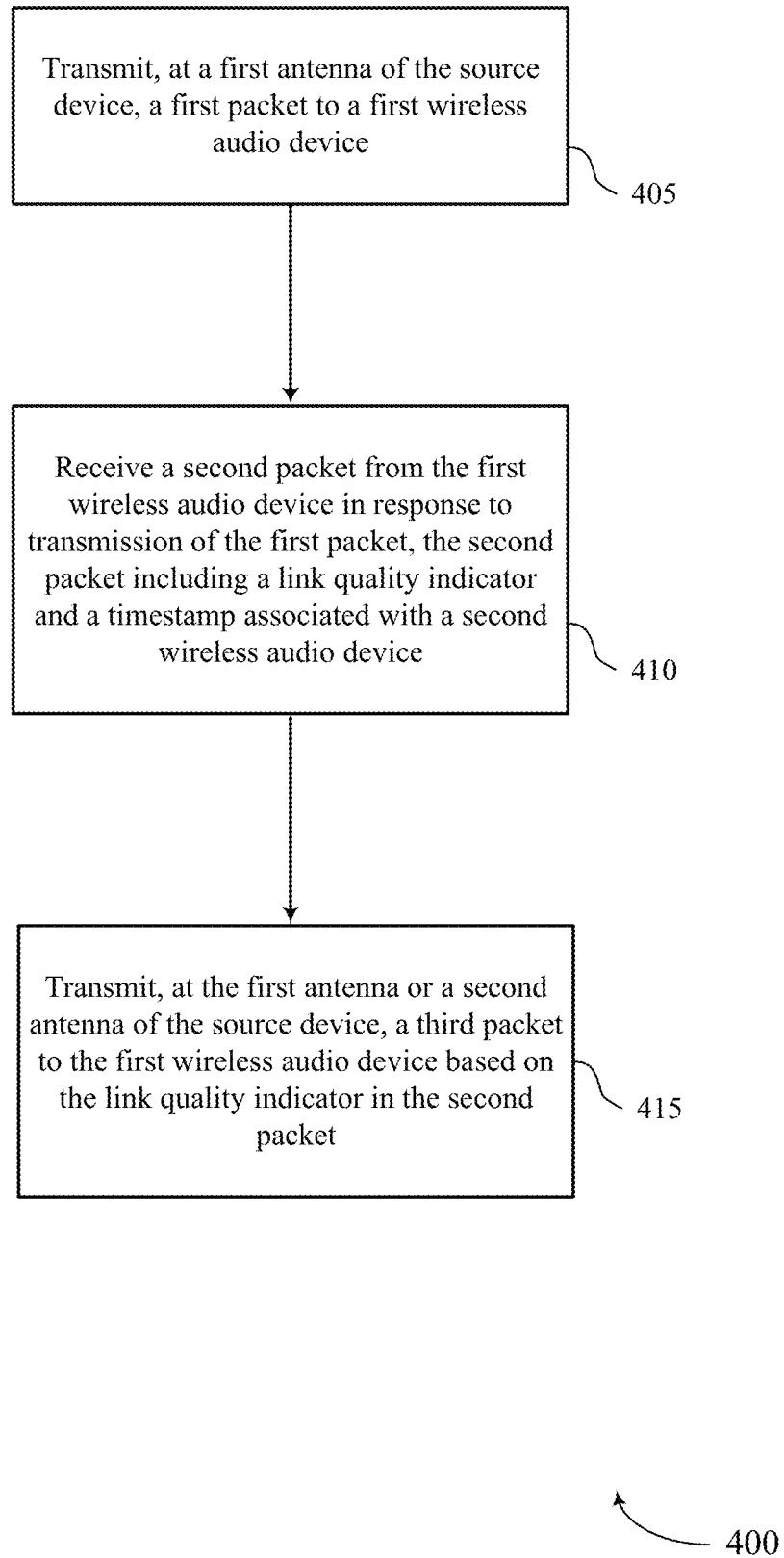
FIGS. 4, 5 and 6 show flowcharts illustrating example methods that support improved antenna selection diversity in accordance with aspects of the present disclosure.

FIG. 4 illustrates a flowchart of an example method 400 that supports improved antenna selection diversity in accordance with various aspects of the present disclosure. In one example, the method 400 may be implemented by a source device (e.g., source devices 110, 210, and 310), although other suitable devices or wireless audio devices may implement the method 400 as well. Although the method 400 is described herein with reference to a particular order, in various examples, blocks herein may be performed in a different order, or omitted, and additional blocks may be added.

In block 405, the method comprises transmitting, at a first antenna of the source device, a first packet to a first wireless audio device. In block 410, the method comprises receiving a second packet from the first wireless audio device in response to the transmission of the first packet. The second packet may include a link quality indicator and a timestamp associated with a second wireless audio device. In block 415, the method comprises transmitting, at the first antenna or a second antenna of the source device, a third packet to the first wireless audio device based on the link quality indicator in the second packet. For example, based on the timestamp in the second packet, the source device may determine that the first antenna was associated with the link quality indicator in the second packet, and based on the link quality indicator in the second packet, the source device may select the first antenna or a second antenna for transmission of the third packet. For instance, the source device may compare the link quality indictor to a predetermined threshold, and based on the comparison, the source device may determine whether to switch antennas.

Figure 5:
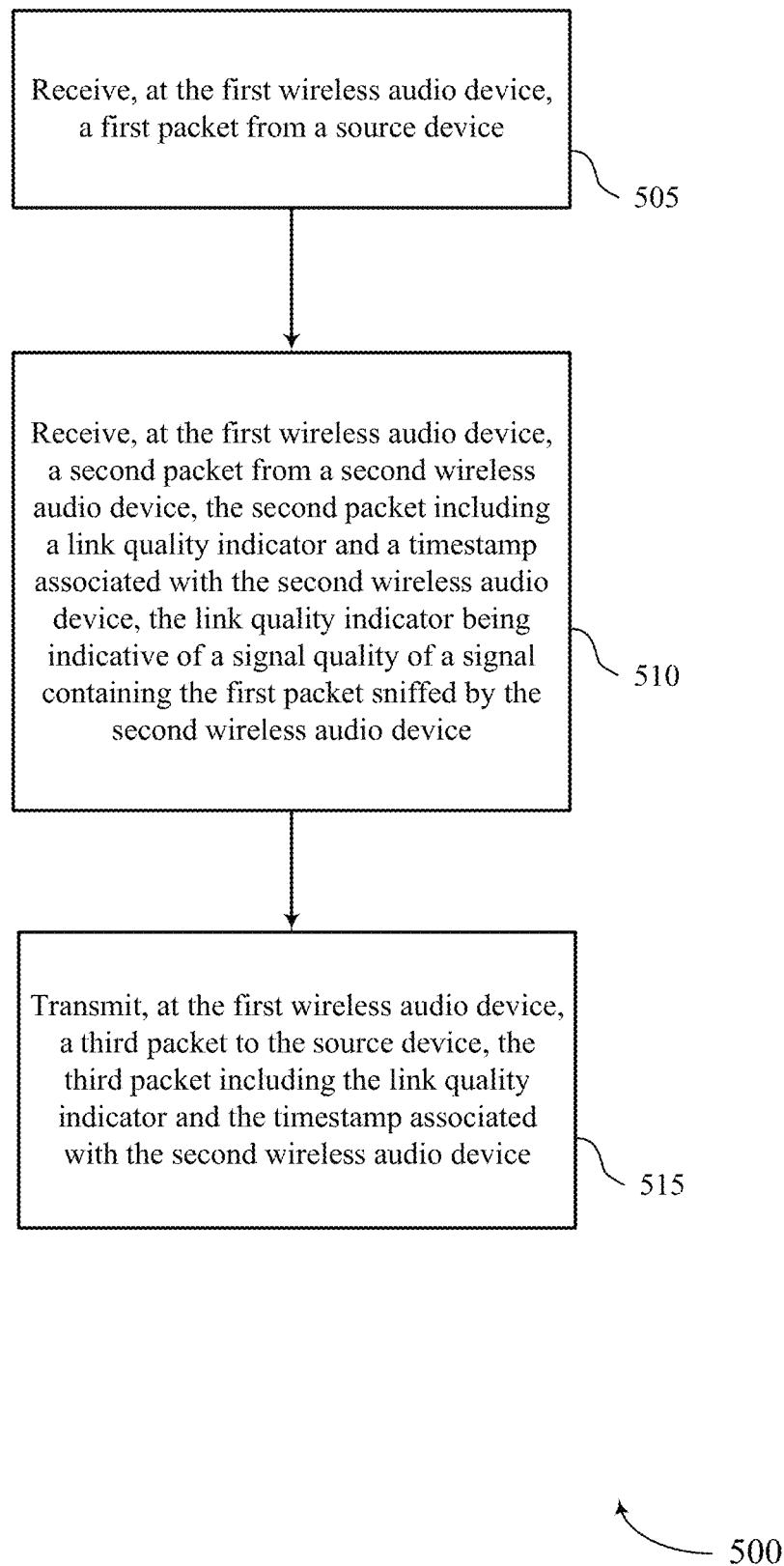

FIG. 5 illustrates a flowchart of an example method 500 that supports improved antenna selection diversity in accordance with various aspects of the present disclosure. In one example, the method 500 may be implemented by a first wireless audio device (e.g., wireless audio devices 115, 215-*a*, and 315-*a*), although other suitable devices, wireless audio devices, and source devices may implement the method 500 as well. Although the method 500 is described herein with reference to a particular order, in various examples, blocks herein may be performed in a different order, or omitted, and additional blocks may be added.

In block 505, the method comprises receiving, at the first wireless audio device, a first packet from a source device. In block 510, the method comprises receiving, at the first wireless audio device, a second packet from a second wireless audio device. The second packet may include a link quality indicator and a timestamp associated with the second wireless audio device, the link quality indicator being indicative of a signal quality of a signal containing the first packet sniffed by the second wireless audio device. In block 515, the method comprises transmitting, at the first wireless audio device, a third packet to the source device. The third packet may include the link quality indicator and the timestamp associated with the second wireless audio device.

Figure 6:
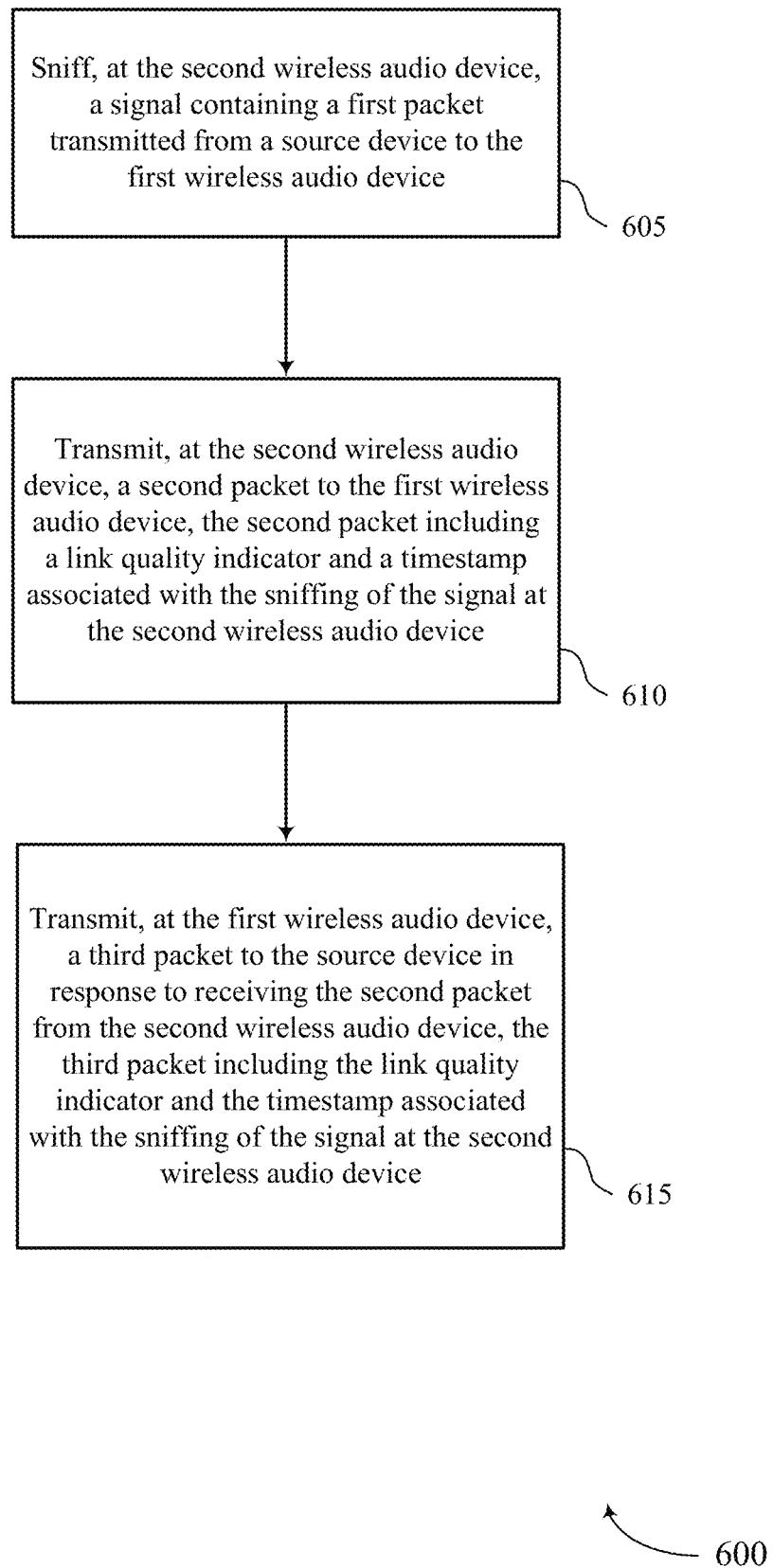

FIG. 6 illustrates a flowchart of an example method 600 that supports improved antenna selection diversity in accordance with various aspects of the present disclosure. In one example, the method 600 may be implemented by a first wireless audio device (e.g., wireless audio devices 115, 215-a, and 315-a) and a second wireless audio device (e.g., wireless audio devices 115, 215-b, and 315-b), although other suitable devices and source devices may implement the method 600 as well. Although the method 600 is described herein with reference to a particular order, in various examples, blocks herein may be performed in a different order, or omitted, and additional blocks may be added.

In block 605, the method comprises sniffing, at the second wireless audio device, a signal containing a first packet transmitted from a source device to the first wireless audio device. In block 610, the method comprises transmitting, at the second wireless audio device, a second packet to the first wireless audio device. The second packet may include a link quality indicator and a timestamp associated with the sniffing of the signal at the second wireless audio device. In block 615, the method comprises transmitting, at the first wireless audio device, a third packet to the source device. The third packet may include the link quality indicator and the timestamp associated with the sniffing of the signal at the second wireless audio device.

Figure 7:
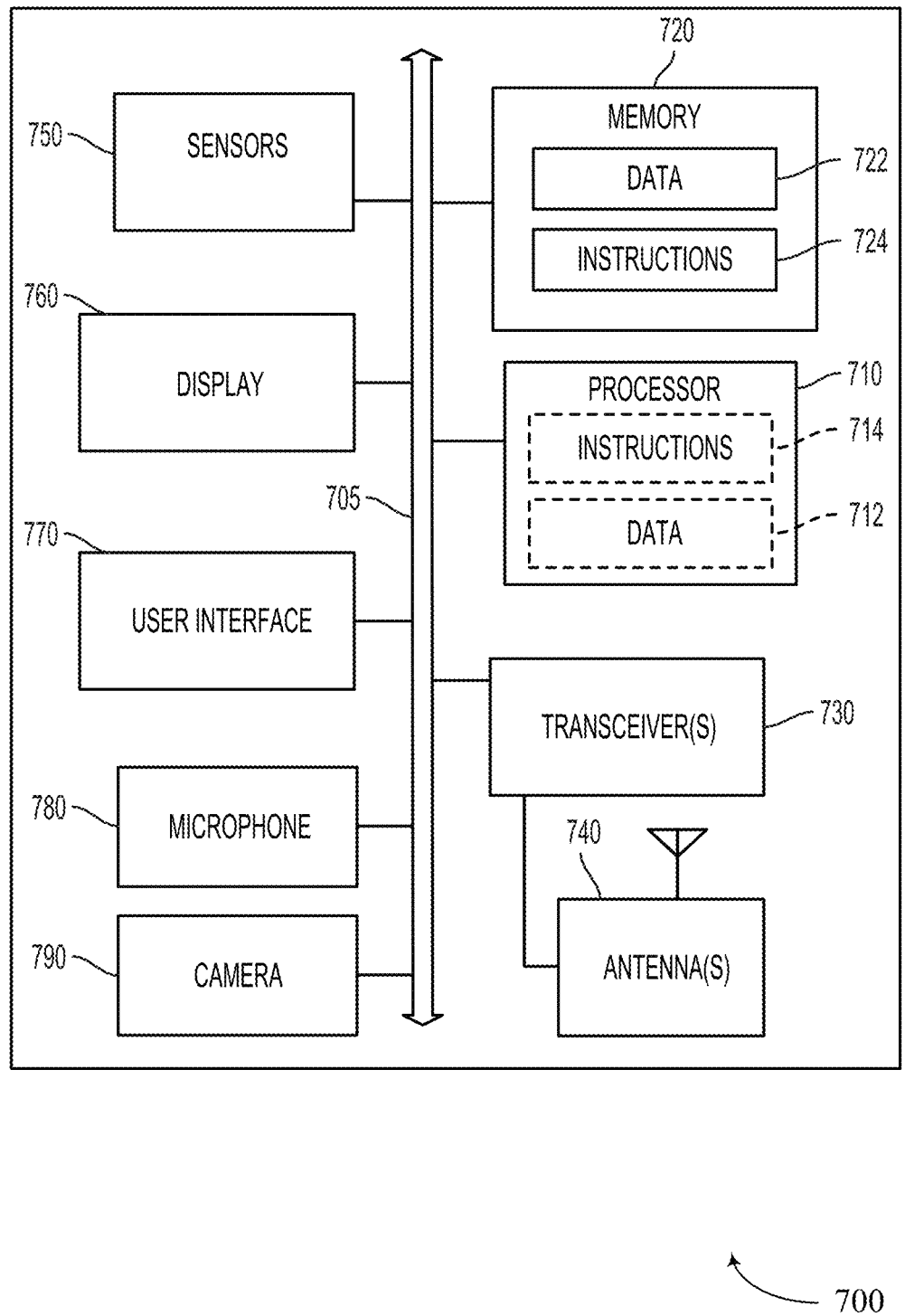
FIGS. 7 and 8 show block diagrams illustrating example devices that support improved antenna selection diversity in accordance with aspects of the present disclosure.

FIG. 7 shows an example source device 700. The source device 700 is representative of a wide variety of electronic devices as described throughout, including and not limited to the electronic devices 110, 210, and 310, depicted in FIGS. 1-3.

The source device 700 can include a processor 710, a memory 720, at least one transceiver 730 (i.e., a transmitter and a receiver), and at least one antenna 740. The source device 700 also can include one or more sensors 750, a display 760, a user interface (UI) 770 (such as a keypad, touchscreen, voice or gesture interface), a microphone 780 (representative of a microphone and a speaker) and a camera 790. Although not depicted, the source device 700 can include one or more network interfaces, such as a wireless network interface (like a Bluetooth interface, a BLE interface, a cellular interface, a Wi-Fi, or other WLAN interface, a WiMAX interface, a ZigBee® interface, a Wireless USB interface, etc.) or a wired network interface (like as a powerline communication interface, an Ethernet interface, etc.). In some implementations, the source device 700 may support multiple network interfaces, each of which may be configured to couple the source device 700 to a different communication network. Each of the components (or "modules") described with reference to FIG. 7 can communicate with one another, directly or indirectly, over at least one bus 705. The bus 705 may include a power bus, a control signal bus, a status signal bus, a data bus, etc. Example buses 705 can include PCI, ISA, PCI-Express, HyperTransport®, InfiniBand®, NuBus, AHB, AXI, etc.

The processor 710 may be a general-purpose single- or multi-chip microprocessor (such as an Advanced RISC (Reduced Instruction Set Computer) Machine (ARM)), a special purpose microprocessor (such as a digital signal processor (DSP)), a microcontroller, a programmable gate array (such as a field programmable gate array (FPGA)), a shift register, etc. The processor 710 may be referred to as a central processing unit (CPU). Although just a single processor 710 is depicted in the source device 700 of FIG. 7, in alternative implementations, a combination of processors (such as an ARM and DSP) including multiple processors, multiple cores, multiple nodes, or implementing multi-threading, etc., can be used.

The source device 700 also includes memory 720 in electronic communication with the processor 710 (i.e., the processor can read information from and write information to the memory 720). Memory 720 can be deemed to be in electronic communication with the processor 710 if the processor 710 can read information from or write information to the memory 720. The memory 720 may be any electronic component capable of storing electronic information. The memory 720 may be configured as random-access memory (RAM), read-only memory (ROM), non-volatile random-access memory (NVRAM), magnetic disk storage media, optical storage media, flash memory devices in RAM, on-board memory included with the processor, erasable programmable read-only memory (EPROM), electrically erasable programmable read-only memory (EEPROM), registers and so forth, including combinations thereof.

Data 722 and instructions 724 may be stored in the memory 720. The instructions may include one or more programs, routines, sub-routines, functions, procedures, code, etc. The instructions may include a single computer-readable statement or many computer-readable statements. The instructions 724 may be executable by the processor 710 to implement the methods disclosed herein. Executing the instructions 724 may involve the use of the data 722 that is stored in the memory 720. When the processor 710 executes the instructions 724, various portions of the instructions 714 may be loaded onto the processor 710, and various pieces of data 712 may be loaded onto the processor 710.

The memory 720 also can store processor- or computer-executable software code containing instructions that, when executed, cause the processor 710 to perform various functions described herein for magnetic communication, including reception of a signal, and generation and transmission of an appropriate response signal.

The processor 710 processes information received through the transceiver 730 as well as information to be sent to the transceiver 730 for transmission through the antenna 740. Additionally, the processor 710 can process information received through one or more sensors 750 as well as information to be presented by the display 760.

In some implementations, the transceiver 730 can be implemented as both a transmitter and a receiver, and can modulate data and provide the modulated data to the antenna 740 for transmission, as well as to demodulate data received from the antenna 740. In some such implementations, the transceiver 730 can be implemented as at least one RF transmitter and at least one separate RF receiver. The transceiver 730 may communicate bi-directionally, via one or more antennas, wired, or wireless communication links as described above. For example, the transceiver 730 may represent a wireless transceiver and may communicate bi-directionally with another wireless transceiver, such as a wireless transceiver associated with the sink devices, or the wireless audio devices 115, 215-a, 215-b, 315-a, and 315-b, depicted in FIGS. 1-3. The transceiver 730 also may include a modem to modulate the packets and provide the modulated packets to the antennas for transmission, and to demodulate packets received from the antennas.

The display 760 can be implemented from any suitable display technology. For example, the display 760 can be implemented from a liquid crystal display (LCD), an e-ink display, a digital microshutter (DMS) display, or an interferometric modulator (IMOD) display. Additionally, the display 760 can be implemented as a flat-panel display, such as plasma, electroluminescent (EL) displays, organic light emitting diode (OLED) display, super twisted nematic (STN) display, or thin-film transistor (TFT) LCD, or a non-flat-panel display, such as a cathode ray tube (CRT) or other tube device. The microphone 780 and the camera 790 allow the source device 700 to be suitable for engaging in voice and video communications.

Figure 8:
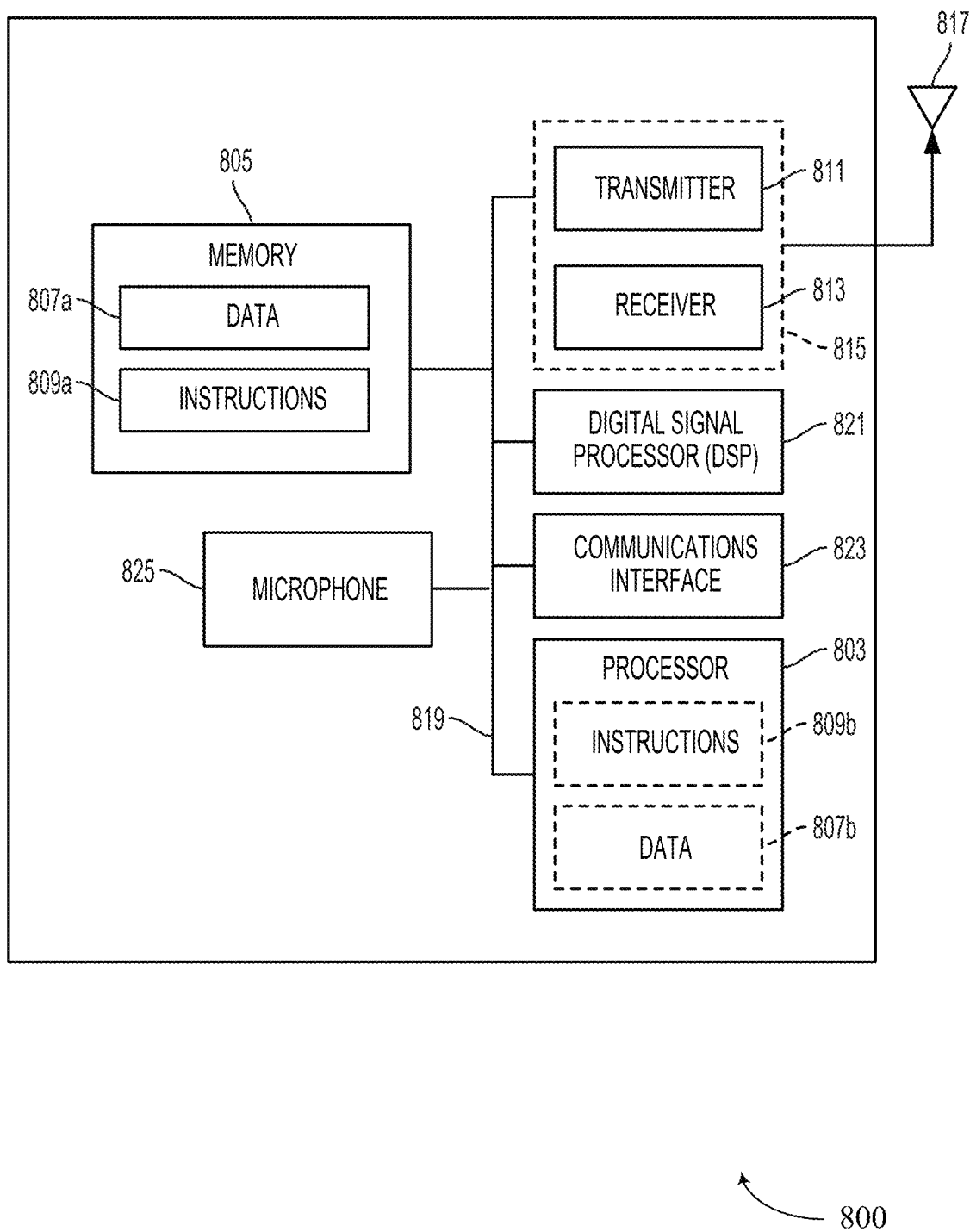

FIG. 8 shows example components that may be included within a sink device 800. The sink device 800 is representative of a wide variety of electronic devices as described throughout, including and not limited to the wireless audio devices 115, 215-a, 215-b, 315-a, and 315-b, described with reference to FIGS. 1-3.

The sink device 800 includes a processor 803. The processor 803 may be a general-purpose single- or multi-chip microprocessor (such as an Advanced RISC (Reduced Instruction Set Computer) Machine (ARM)), a special purpose microprocessor (such as a digital signal processor (DSP)), a microcontroller, a programmable gate array (such as a field programmable gate array (FPGA)), a shift register, etc. The processor 803 may be referred to as a central processing unit (CPU). Although just a single processor 803 is depicted in the sink device 800 of FIG. 8, in alternative implementations, a combination of processors (such as an ARM and DSP) including multiple processors, multiple cores, multiple nodes, or implementing multi-threading, etc., can be used.

The sink device 800 also includes memory 805 in electronic communication with the processor 803 (i.e., the processor can read information from and write information to the memory 805). The memory 805 can be deemed to be in electronic communication with the processor 803 if the processor 803 can read information from or write information to the memory 805. The memory 805 may be any electronic component capable of storing electronic information. The memory 805 may be configured as random-access memory (RAM), read-only memory (ROM), non-volatile random-access memory (NVRAM), magnetic disk storage media, optical storage media, flash memory devices in RAM, on-board memory included with the processor, erasable programmable read-only memory (EPROM), electrically erasable programmable read-only memory (EEPROM), registers and so forth, including combinations thereof.

Data 807a and instructions 809a may be stored in the memory 805. The instructions may include one or more programs, routines, sub-routines, functions, procedures, code, etc. The instructions may include a single computer-readable statement or many computer-readable statements. The instructions 809a may be executable by the processor 803 to implement the methods disclosed herein. Executing the instructions 809a may involve the use of the data 807a that is stored in the memory 805. When the processor 803 executes the instructions 809, various portions of the instructions 809b may be loaded onto the processor 803, and various pieces of data 807b may be loaded onto the processor 803.

The memory 805 also can store processor- or computer-executable software code containing instructions that, when executed, cause the processor 803 to perform various functions described herein for magnetic communication, including reception of a signal, and generation and transmission of an appropriate response signal.

The sink device 800 also may include a transmitter 811 and a receiver 813 to allow transmission and reception of signals to and from the sink device 800 via one or more antennas 817. The transmitter 811 and receiver 813 may be collectively referred to as a transceiver 815. The transceiver 815 also may include a modem to modulate the packets and provide the modulated packets to the antennas for transmission, and to demodulate packets received from the antennas. The sink device 800 also may include (not shown) multiple transmitters, multiple antennas, multiple receivers, and multiple transceivers. For example, the transceiver 815 can be implemented as at least one RF transmitter and at least one separate RF receiver. Alternatively, the transceiver 815 can be implemented as at least one RF transmitter and receiver and at least one magnetic communication-based transmitter and receiver. The processor 803 processes information received through the transceiver 815 as well as information to be sent to the transceiver 815 for transmission through the antenna 817.

The transceiver 815 may communicate bi-directionally, via one or more antennas, wired, wireless, or magnetic communication links as described above. For example, the transceiver 815 may represent a wireless transceiver in a first sink device and may communicate with another wireless transceiver in a second sink device, such as the wireless transceivers associated with the wireless audio devices 115, 215-a, 215-b, 315-a, and 315-b, described with reference to FIGS. 1-3.

The sink device 800 may include a digital signal processor (DSP) 821. The sink device 800 also may include a communications interface 823. The communications interface 823 can be implemented as a user interface (UI) (such as a keypad, touchscreen, voice or gesture interface), and may allow a user to interact with the sink device 800. The sink device 800 also may include a microphone 825 (representative of a microphone and a speaker) for playing audio data.

The various components of the sink device 800 may be coupled together by one or more buses, which may include a power bus, a control signal bus, a status signal bus, a data bus, etc. For the sake of clarity, the various buses are illustrated in FIG. 8 as a bus system 819.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logics, logical blocks, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described throughout. Whether such functionality is implemented in hardware or software depends upon the particular application and design constraints imposed on the overall system. A person having ordinary skill in the art will appreciate that various aspects also can be described as functional equivalents to the structures, materials or devices disclosed herein.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, or, any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also can be implemented as one or more computer programs, i.e., one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that can be enabled to transfer a computer program from one place to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of any device as implemented.

Certain features that are described in this specification in the context of separate implementations also can be implemented in combination in a single implementation. Conversely, various features that are described in the context of a single implementation also can be implemented in multiple implementations separately or in any suitable subcombination. Moreover, although features may be described as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted can be incorporated in the example processes that are schematically illustrated. For example, one or more additional operations can be performed before, after, simultaneously, or between any of the illustrated operations. In certain circumstances, multitasking and parallel processing may be advantageous. Moreover, the separation of various system components in the implementations described should not be understood as requiring such separation in all implementations, and it should be understood that the described program components and systems can generally be integrated together in a single software product or packaged into multiple software products. Additionally, other implementations are within the scope of the following claims. In some cases, the actions recited in the claims can be performed in a different order and still achieve desirable results.

What is claimed is:

1. An apparatus for wireless communication at a source device, comprising:
    a processor;
    memory in electronic communication with the processor; and
    instructions stored in the memory and executable by the processor to cause the apparatus to:
        transmit, at a first antenna of the source device, a first packet to a first wireless audio device;
        receive a second packet from the first wireless audio device in response to the transmission of the first packet, the second packet including a link quality indicator and a timestamp associated with a second wireless audio device, wherein the link quality indicator is indicative of a signal quality of a signal containing the first packet sniffed by the second wireless audio device; and
        transmit, at the first antenna or a second antenna of the source device, a third packet to the first wireless audio device based on the link quality indicator in the second packet.

2. The apparatus of claim 1, wherein the instructions are further executable by the processor to cause the apparatus to:
select the first antenna or the second antenna for transmission of the third packet based on the link quality indicator in the second packet.

3. The apparatus of claim 1, wherein the timestamp identifies a time that the signal quality, represented by the link quality indicator, was measured at the second wireless audio device.

4. The apparatus of claim 1, wherein the link quality indicator comprises a received signal strength indicator at the second wireless audio device.

5. The apparatus of claim 1, wherein the link quality indicator comprises a signal-to-noise-ratio at the second wireless audio device.

6. The apparatus of claim 1, wherein the link quality indicator comprises a packet error rate at the second wireless audio device.

7. The apparatus of claim 1, wherein the instructions are further executable by the processor to cause the apparatus to:
determine the link quality indicator in the second packet is indicative of a signal quality of a signal from the first antenna based on the timestamp in the second packet.

8. The apparatus of claim 1, wherein the instructions are further executable by the processor to cause the apparatus to:
compare the link quality indicator to a predetermined threshold.

9. The apparatus of claim 8, wherein the instructions are further executable by the processor to cause the apparatus to:
select the second antenna for transmission of the third packet if the link quality indicator is less than the predetermined threshold.

10. The apparatus of claim 1, wherein the second packet further includes a link quality indicator and a timestamp associated with a reception of the first packet at the first wireless audio device.

11. The apparatus of claim 10, wherein the instructions are further executable by the processor to cause the apparatus to:
compare the link quality indicator associated with the first wireless audio device to a first predetermined threshold; and
compare the link quality indicator associated with the second wireless audio device to a second predetermined threshold.

12. The apparatus of claim 11, wherein the first predetermined threshold and the second predetermined threshold are different.

13. The apparatus of claim 11, wherein the first predetermined threshold and the second predetermined threshold are equal.

14. The apparatus of claim 11, wherein the instructions are further executable by the processor to cause the apparatus to:
select the second antenna for transmission of the third packet if at least one of: the link quality indicator associated with the first wireless audio device is less than the first predetermined threshold, or the link quality indicator associated with the second wireless audio device is less than the second predetermined threshold.

15. The apparatus of claim 11, wherein the instructions are further executable by the processor to cause the apparatus to:
select the first antenna for transmission of the third packet if: the link quality indicator associated with the first wireless audio device is greater than the first predetermined threshold, and the link quality indicator associated with the second wireless audio device is greater than the second predetermined threshold.

16. An apparatus for wireless communication at a first wireless audio device, comprising:
a processor;
memory in electronic communication with the processor; and
instructions stored in the memory and executable by the processor to cause the apparatus to:
receive a first packet from a source device;
receive a second packet from a second wireless audio device, the second packet including a link quality indicator and a timestamp associated with the second wireless audio device, the link quality indicator being indicative of a signal quality of a signal containing the first packet sniffed by the second wireless audio device; and
transmit a third packet to the source device, the third packet including the link quality indicator and the timestamp associated with the second wireless audio device.

17. The apparatus of claim 16, wherein the timestamp identifies a time that the signal quality, represented by the link quality indicator, was measured at the second wireless audio device.

18. The apparatus of claim 16, wherein the link quality indicator comprises a received signal strength indicator at the second wireless audio device.

19. The apparatus of claim 16, wherein the link quality indicator comprises a signal-to-noise-ratio at the second wireless audio device.

20. The apparatus of claim 16, wherein the link quality indicator comprises a packet error rate at the second wireless audio device.

21. The apparatus of claim 16, wherein the third packet further includes a link quality indicator and a timestamp associated with the reception of the first packet at the first wireless device.

22. A system for wireless communication, comprising:
a first wireless audio device; and
a second wireless audio device in wireless communication with the first wireless audio device, the second wireless audio device configured to:
sniff a signal containing a first packet transmitted from a source device to the first wireless audio device, and
transmit a second packet to the first wireless audio device, the second packet including a link quality indicator and a timestamp associated with the sniffing of the signal at the second wireless audio device;
wherein the first wireless audio device is configured to transmit a third packet to the source device in response to receiving the second packet from the second wireless audio device, the third packet including the link quality indicator and the timestamp associated with the sniffing of the signal at the second wireless audio device.

23. The system of claim 22, wherein the second wireless audio device is further configured to measure a signal quality of the sniffed signal.

24. The system of claim 23, wherein the link quality indicator is indicative of the measured signal quality of the sniffed signal.

25. The system of claim 23, wherein the timestamp identifies a time the signal quality was measured at the second wireless audio device.

26. The system of claim 22, wherein the link quality indicator comprises a received signal strength indicator at the second wireless audio device.

27. The system of claim 22, wherein the link quality indicator comprises a signal-to-noise-ratio at the second wireless audio device.

28. The system of claim 22, wherein the link quality indicator comprises a packet error rate at the second wireless audio device.

29. The system of claim 22, wherein the third packet further includes a link quality indicator and a timestamp associated with a reception of the first packet at the first wireless device.

* * * * *